No. 765,370. PATENTED JULY 19, 1904.
G. A. WEBER.
INSULATED RAIL JOINT.
APPLICATION FILED DEC. 28, 1903.
NO MODEL. 5 SHEETS—SHEET 4.
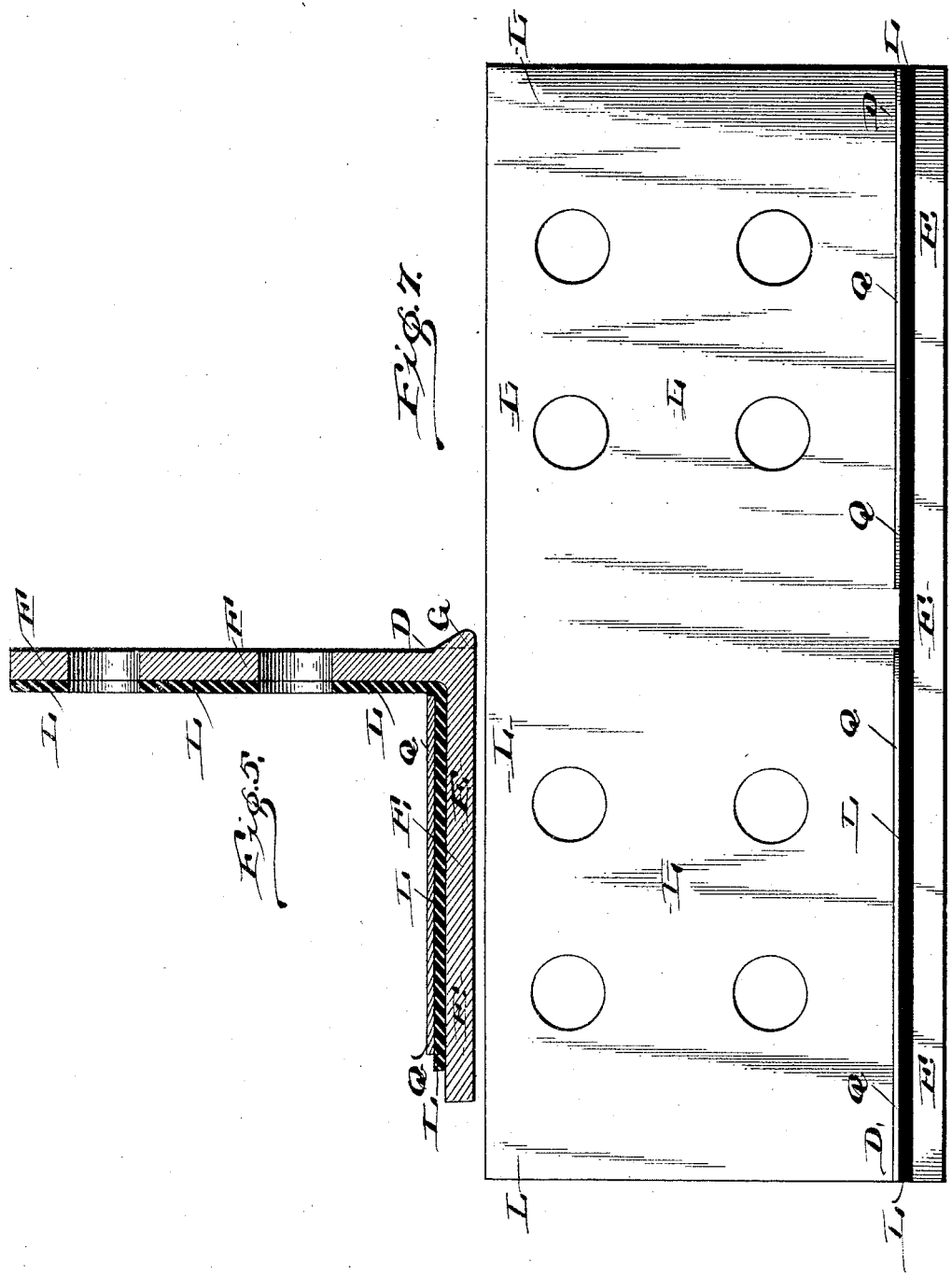
Witnesses
Oliv A Foster
A. L. O'Brien
Inventor
George A. Weber
By Dickerson Brown Raegner & Binney attys No. 765,370. PATENTED JULY 19, 1904.
G. A. WEBER.
INSULATED RAIL JOINT.
APPLICATION FILED DEC. 28, 1903.
NO MODEL. 5 SHEETS—SHEET 5.
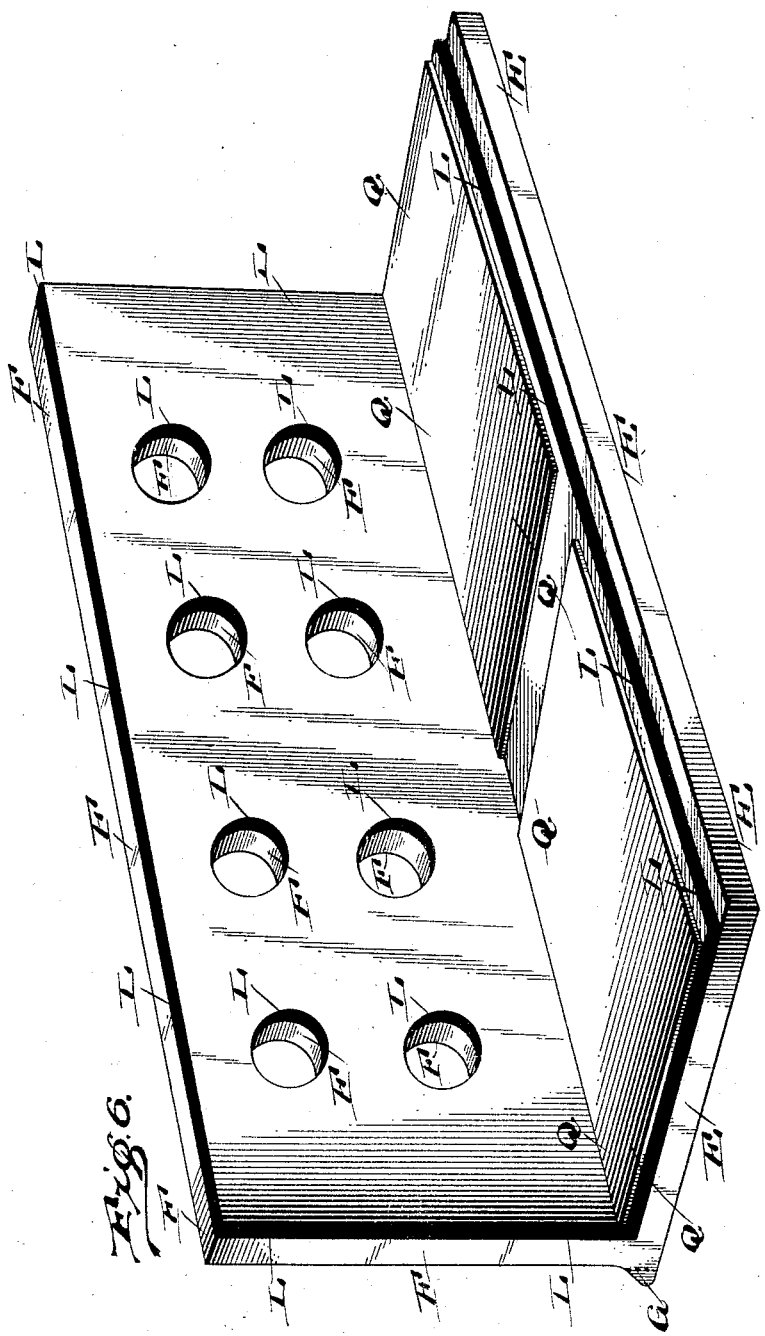
Witnesses
Olin A Foster
A. L. O'Brien
Inventor
George A. Weber
By Dickerson Brown Raegener
& Binney attys No. 765,370. Patented July 19, 1904.

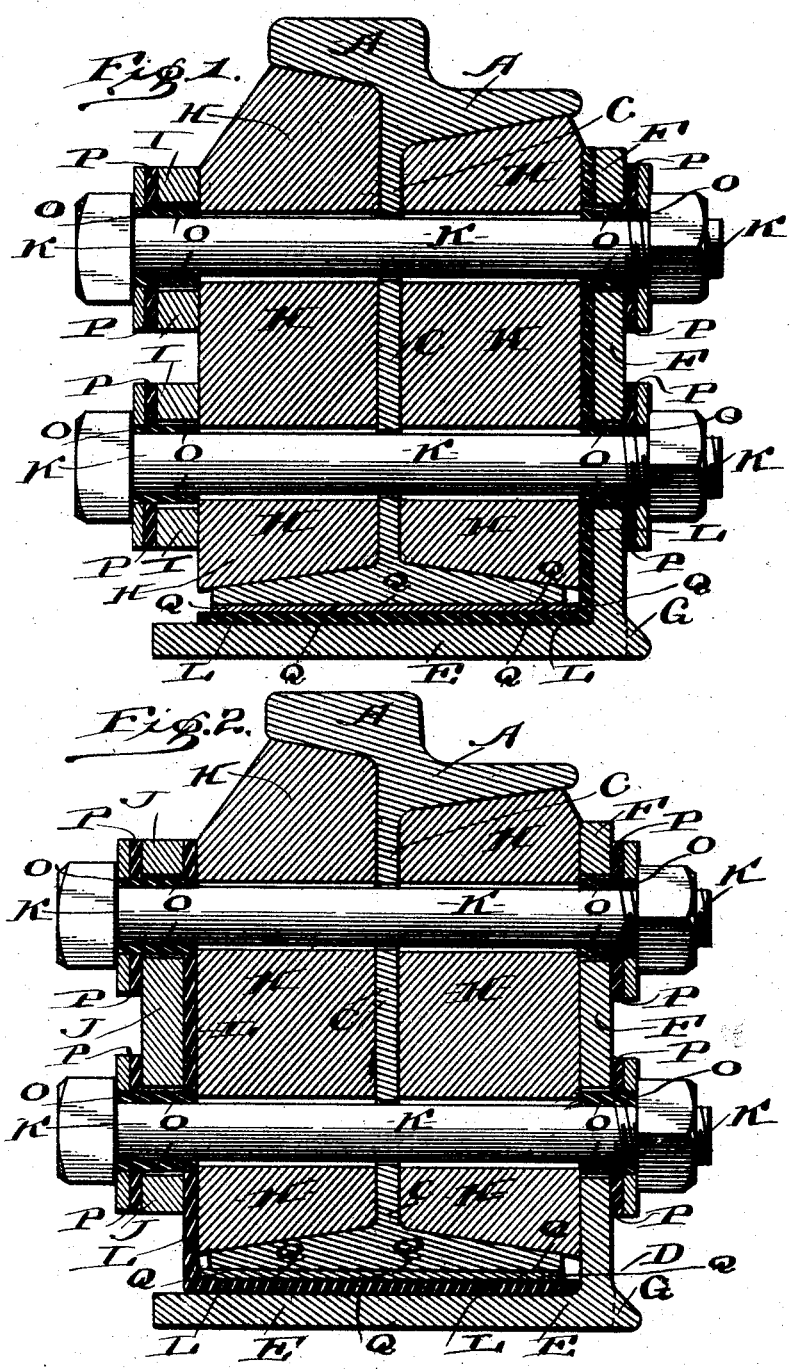

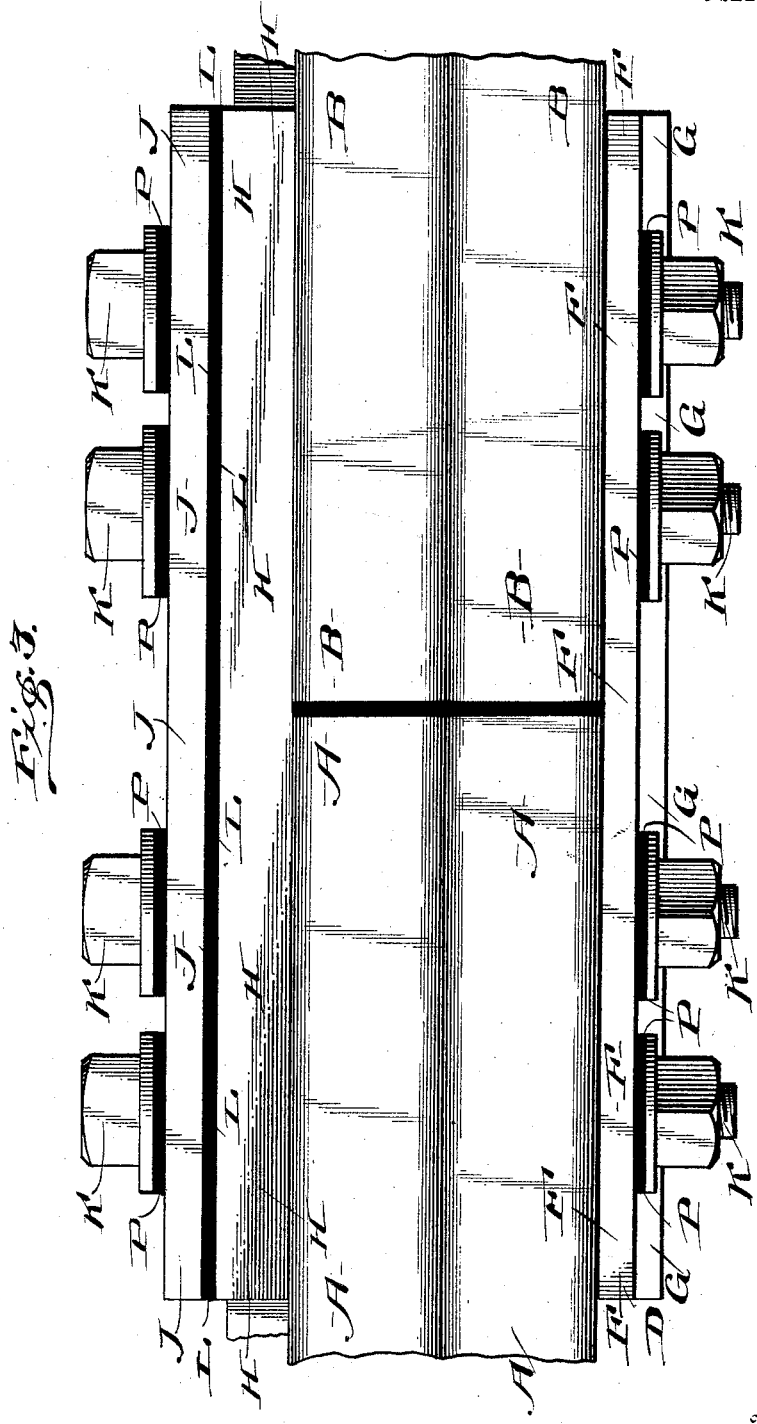

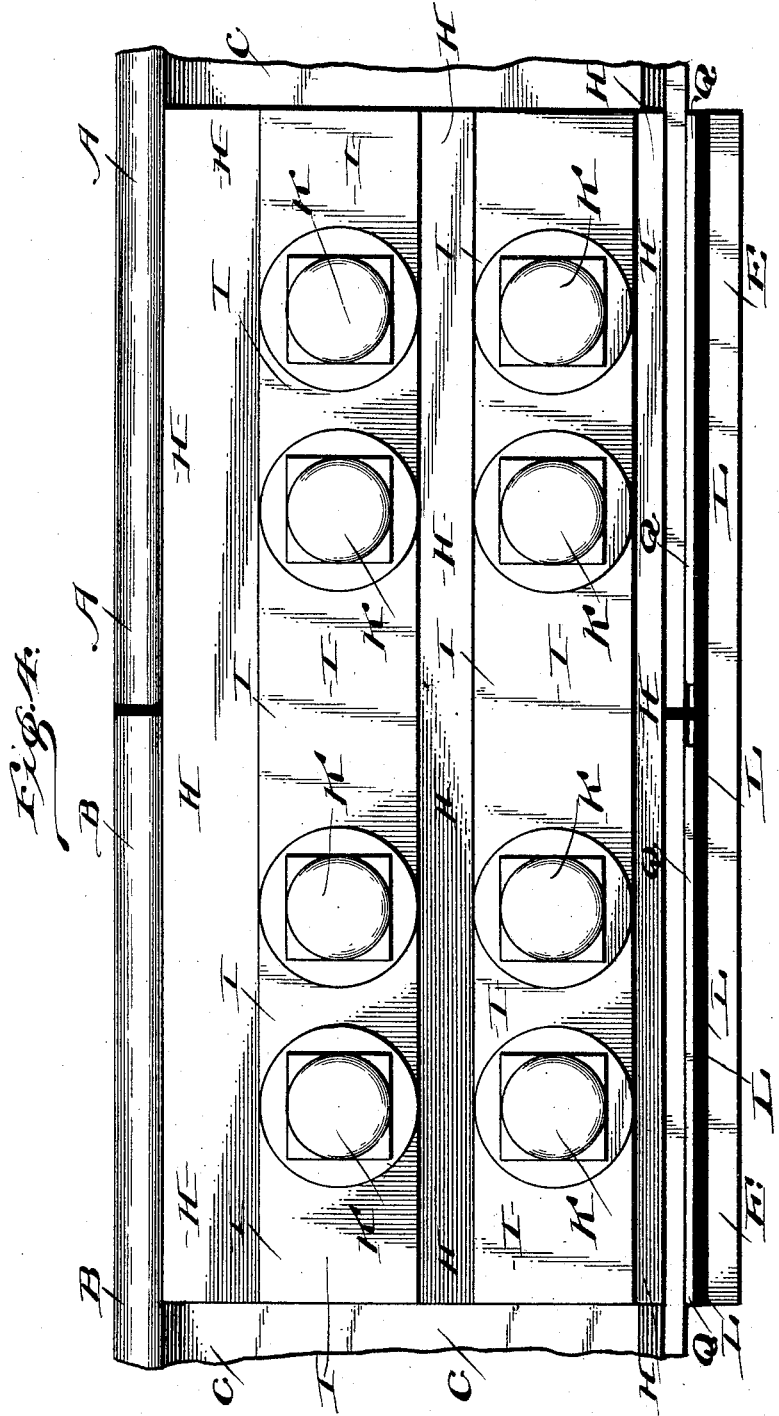

UNITED STATES PATENT OFFICE.

GEORGE A. WEBER, OF NEW YORK, N. Y., ASSIGNOR TO WEBER RAILWAY JOINT MANUFACTURING COMPANY, OF NEW YORK, N. Y., A CORPORATION OF WEST VIRGINIA.

INSULATED RAIL-JOINT.

SPECIFICATION forming part of Letters Patent No. 765,370, dated July 19, 1904.

Application filed December 28, 1903. Serial No. 186,837. (No model.)

*To all whom it may concern:*

Be it known that I, GEORGE A. WEBER, a citizen of the United States, and a resident of the borough of Manhattan, city, county, and State of New York, have invented certain new and useful Improvements in Insulated Rail-Joints, of which the following is a specification accompanied by drawings.

This invention relates to insulated rail-joints; and its objects are to secure efficient insulating means for insulating girder-joints, while at the same time affording the requisite strength and efficiency for the joint.

Another object of the invention is to prevent the rails from wearing through the insulation beneath their bases and establishing a short circuit.

Further objects of the invention will hereinafter appear; and to these ends the invention consists of an insulated rail-joint embodying the features of construction, combinations of elements, and arrangement of parts, substantially as hereinafter fully described and claimed in this specification, and shown in the accompanying drawings, in which—

Figures 1 and 2 are transverse sectional views of joints embodying the invention. Fig. 3 is a plan view. Fig. 4 is a side elevation of Fig. 1. Fig. 5 is a sectional view of a chair, insulating material, and protective plates. Fig. 6 is a perspective view of the chair, insulating material, and protective plates. Fig. 7 is a side elevation of the chair.

Referring to the drawings, A and B represent the meeting ends of rails, in this instance shown as girder-rails having a high web portion C. The rails rest upon the chair D, having a base E, upright F, with a spiking rib or fillet G. Any suitable rail-chair may be used, the one illustrated being shown of suitable and usual construction. Along the webs of the rails are arranged the filling-blocks H, which may be of wood and sectional or continuous, as desired.

Opposite the upright F of the chair, which forms a bolt-plate, are arranged metallic bars or straps I, extending across the joint. In Fig. 2 one bar or strap J is shown extending across the joint. In both figures the plurality of rows of bolts K are shown securing the parts of the joint together. In Fig. 1 the upper row of bolts passes through the upper strap I and the lower row passes through the lower strap. In Fig. 2 both rows of bolts pass through the single strap J. Any desired number of rows of bolts may be used, in this instance two being shown by way of illustration.

The rails are insulated from the base of the chair by suitable insulation L, which may be secured in position in any suitable manner. In Fig. 1 it is shown extending between the upright of the chair and the filling-block H at that side of the joint, while in Fig. 2 it is shown at the other side of the joint extending up between the strap or bar J and the filling-piece H. In either case the material is clamped between the parts of the joint and held in position. The bolts are suitably insulated from the chair and from the bars I or J by the usual insulating-sleeves O and washers P. The tendency of the rails is to wear into the insulation L, and in order to prevent this as much as possible it has been found advantageous and convenient to place metallic protective plates Q between the bases of the rails and the insulation L, as shown more particularly in Figs. 6, 7, and 8. These plates Q do not extend continuously across the joint, as shown, a space being left at the meeting ends of the rails to prevent current from passing from one rail to the other through the plates. The plates Q may be thin and have been found to operate advantageously for carrying out the objects for which they are designed.

The plates Q may of course be used with any form of insulated joint to which they are applicable, and the method of securing the insulation L, as shown in Fig. 2, may be applied to any form of insulated joint to which it is applicable.

Obviously some features of this invention may be used without others, and the invention may be embodied in widely-varying forms.

Therefore without limiting the invention to the constructions shown and described nor enumerating equivalents, I claim, and desire to secure by Letters Patent, the following:

1. An insulated rail-joint, comprising a suitable rail-support, insulation thereon, metallic protective means for said insulation between the same and the bases of the rails, rail ends to be insulated one from the other, and insulating means for maintaining said rails in alinement, for substantially the purposes set forth.

2. An insulated rail-joint, comprising a rail-chair having a base and an upright, insulation on the base of the chair, metallic protective means for the same between the insulation and the bases of the rails, rail ends to be insulated one from the other, and insulating means for maintaining said rails in alinement, for substantially the purposes set forth.

In testimony whereof I have signed this specification in the presence of two subscribing witnesses.

GEORGE A. WEBER.

Witnesses:
 A. L. O'BRIEN,
 OLIN A. FOSTER.